UNITED STATES PATENT OFFICE.

HENRY JONES, OF BROADMEAD, BRISTOL, ENGLAND, ASSIGNOR TO JNO. FOWLER, OF BALTIMORE, MARYLAND.

IMPROVEMENT IN THE PREPARATION OF FLOUR FOR BREAD-MAKING.

Specification forming part of Letters Patent No. 6,418, dated May 1, 1849.

*To all whom it may concern:*

Be it known that I, HENRY JONES, of Broadmead, in the city and county of Bristol, in the Kingdom of Great Britain, baker, have invented a new Preparation of Flour, for certain purposes hereinafter mentioned; and I do hereby declare that the following is a full and exact description.

The nature of my invention consists in the adding to a certain weight of flour such quantities of alkalines and acids, sugar, and salt as shall, by the addition of water only, enable such prepared flour to be manufactured into bread, &c., without the use of fermenting matter.

To enable others skilled in the art to make and use my invention, I will proceed to describe the method of preparing the flour.

I take the wheat or other grain from which the flour to be prepared is made, of fine quality, perfectly dry, or make it so by passing it over a kiln. After grinding and dressing it I add to one hundred-weight of it ten and a half ounces (avoirdupois) of tartaric acid, finest quality, and as dry as possible, and which has passed through a sieve of sixty wires to the inch. I mix it well with the flour, and pass both through a flour-dressing machine, and allow it to remain untouched for two or three days, that the water of crystallization, always more or less present in the tartaric acid, may be absorbed by the flour, and so form around the particles of acid a coating of flour that will prevent its immediate contact with the particles of alkali, and thereby I avoid reducing its power of action. Afterward I mix with the quantity of flour and acid before named twelve ounces of bicarbonate of soda, (or fourteen ounces of bicarbonate of potassa,) in fine powder, twenty ounces of muriate of soda, and eight ounces of loaf-sugar, in fine powder, and mix the whole thoroughly together, and then put the whole mixture through a flour-dressing machine, when it will be ready for use.

The quantities of acids and alkalies may have to be slightly varied, according to their quality; but the point to be attained is the neutralization of both.

My prepared flour, when used to make bread, biscuits, or other like food, only requires to be made into dough with cold water in the proportion of ten ounces of water to one pound of flour for bread, and about six ounces to one pound of flour for biscuits, and baked at once in a well-heated oven.

I do not claim mixing acid and alkali with flour as a substitute for yeast; nor do I claim mixing one of these ingredients with flour in the dry state when the other is dissolved for making bread; but What I do claim is—

Mixing both the acid and alkali with the flour in the dry state, sugar and salt being added or not at will, substantially in the manner and for the purpose herein set forth, as a new article of manufacture.

Dated in Bristol aforesaid this 1st day of August, 1848.

HENRY JONES.

Witnesses:
 RICHD. BRADFORD,
 JAMES HEADER.